UNITED STATES PATENT OFFICE.

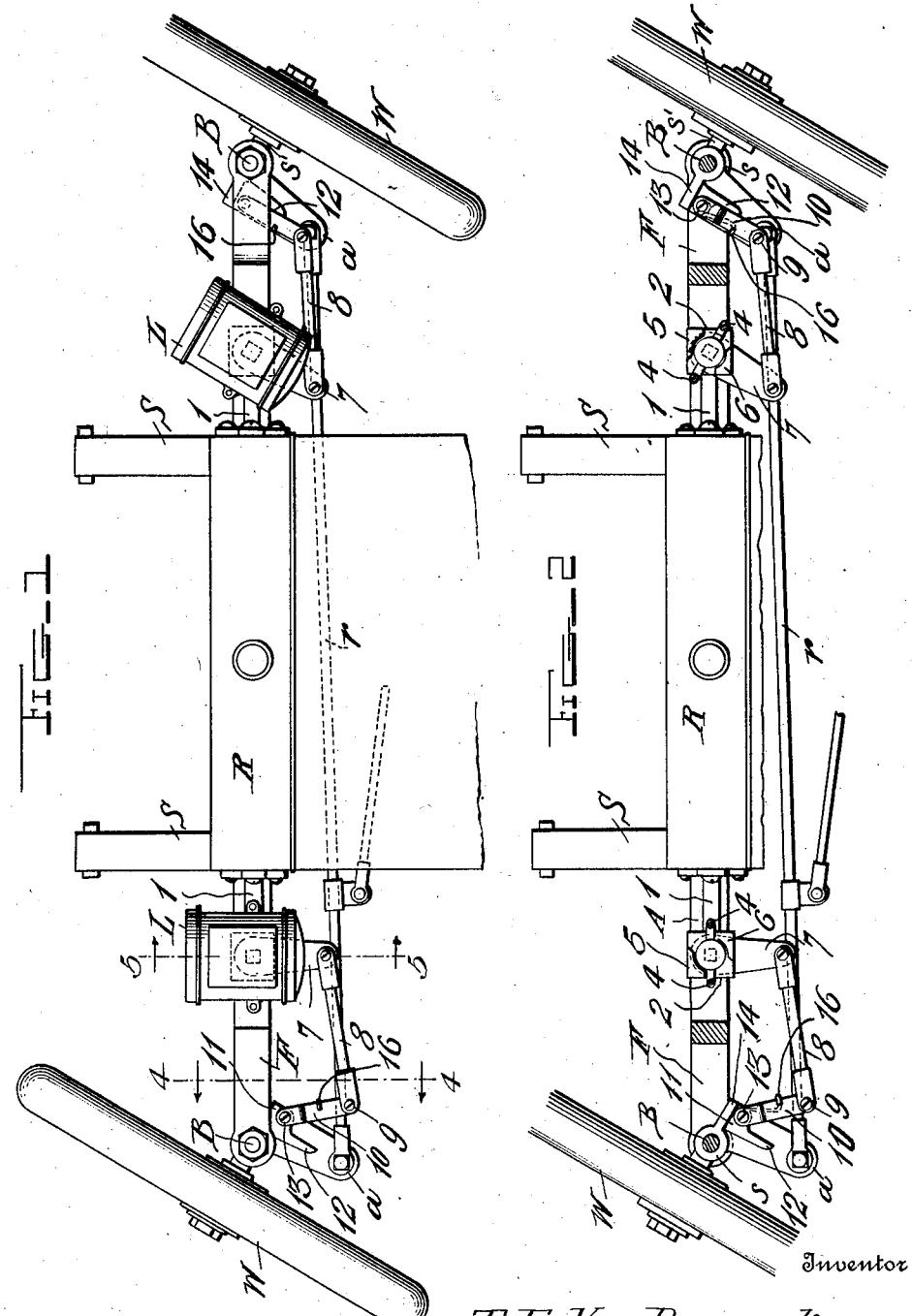

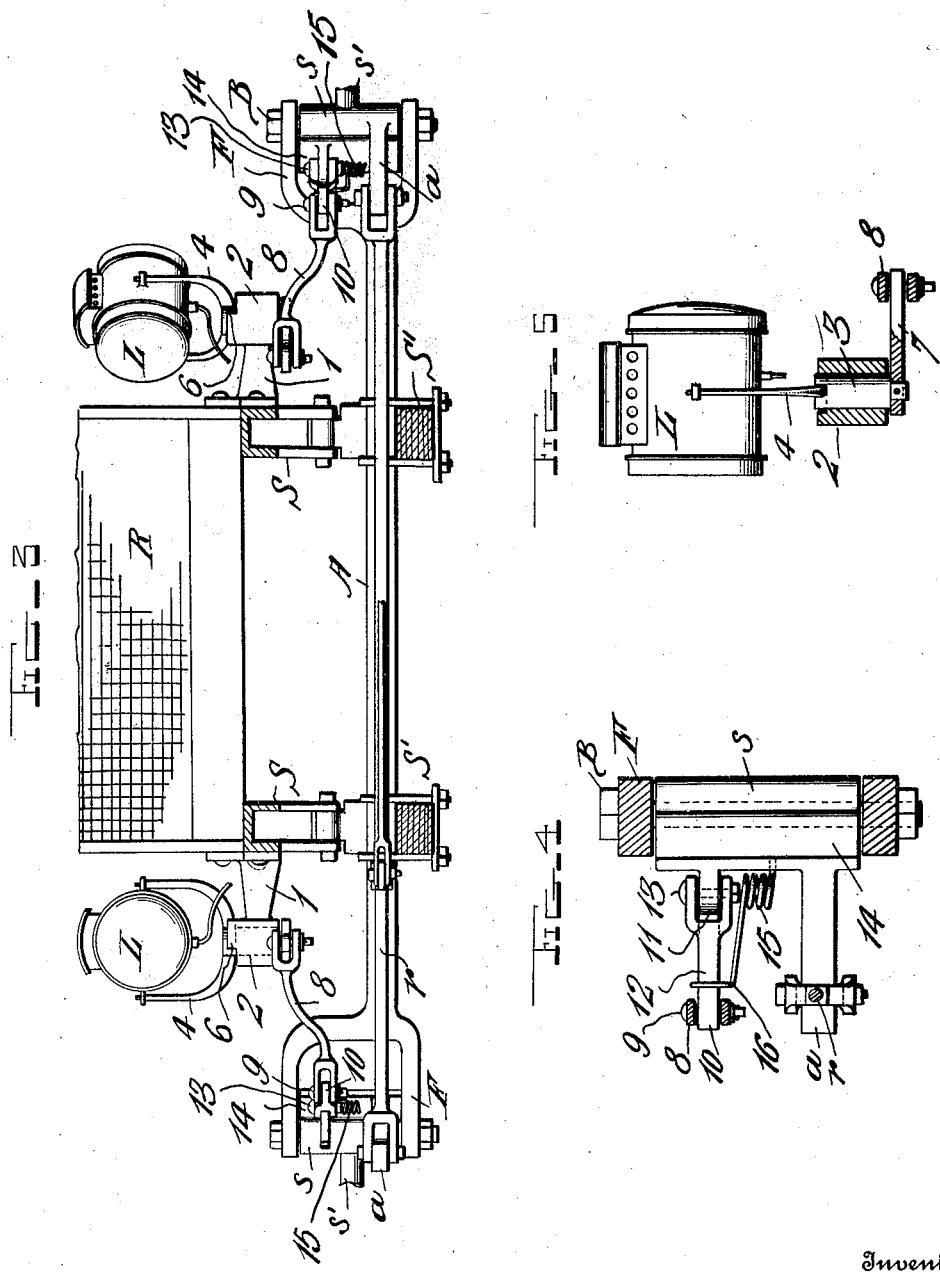

THEODORE EDDY VAN DERWERKEN, OF GREEN ISLAND, NEW YORK, ASSIGNOR OF ONE-HALF TO WILLIAM HENRY RABBETT, OF GREEN ISLAND, NEW YORK.

DEVICE FOR TURNING AUTOMOBILE-HEADLIGHTS.

1,093,897.  Specification of Letters Patent.  Patented Apr. 21, 1914.

Application filed December 26, 1913. Serial No. 808,811.

*To all whom it may concern:*

Be it known that I, THEODORE E. VAN DERWERKEN, a citizen of the United States, residing at Green Island, in the county of Albany and State of New York, have invented certain new and useful Improvements in Devices for Turning Automobile-Headlights; and I do declare the following to be a full, clear, and exact description of the invention, such as will enable others skilled in the art to which it appertains to make and use the same.

This invention relates to improvements in devices for turning the headlights of automobiles simultaneously with the turning of the front wheels thereof, and the main object is to provide a simply constructed device of this character, which will turn the right hand head light when turning to the right, or the left hand head light when turning to the left, it having been found advantageous to at all times have one light facing directly ahead.

With the above objects in view, the invention resides in certain novel features of construction and combination herein described and claimed and shown in the drawings, wherein:—

Figure 1 is a plan view of the front end of an automobile showing the application of my invention thereto. Fig. 2 is a similar view, parts being in horizontal section. Fig. 3 is a vertical section through the frame of the car looking toward the front thereof, and Figs. 4 and 5 are detail vertical sections on the lines 4—4 and 5—5 of Fig. 1, respectively.

In the drawings I have illustrated one embodiment of my invention with the parts attached to certain of the parts of the frame and steering mechanism of the ordinary automobile but I wish it understood that my improved parts may be applied to other parts of the automobile than those to which they are here shown applied, so long as the same result is attained.

In the drawings I have shown the parallel side bars S of an automobile frame, said bars turning downwardly at their front ends and connected to the springs S′ which are secured in the usual way to the front axle A. The opposite ends of the axle A are forked as at F, and journaled within said forked ends upon the usual bearing bolts B are sleeves s to which are secured the stub shafts s′, upon which the front wheels W are revolubly mounted.

1 denotes suitable brackets which while here shown as applied to the side bars S and the radiator R, may be mounted on any suitable part of the machine. These brackets have bearing heads 2 on their outer ends. The central portions of the heads 2 are bored for the reception of journal shafts 3 which carry upright arms 4 secured in any suitable manner to the head lights L. The upper faces of the heads 2 are provided with front and rear stops 5 and 6 with which the arms 4 are adapted to contact in a manner to be described.

Rigidly secured to the lower ends of the shafts 3 are rearwardly extending head light operating arms 7 to which are pivoted the inner ends of connecting links 8, the outer ends of said links being pivotally connected as at 9 with the rear ends of arms 10. The arms 10 are forked at their forward ends and straddle shoulders 11 on the inner sides of stop fingers 12. These arms 10 are pivoted by bolts 13 as shown. The stop fingers 12 may be connected in any suitable manner to any part of the steering mechanism which shifts when the wheels are turned, that is, it may be connected to the connecting rod $r$, the steering arms $a$, the sleeves $s$ or the spindles B when the latter turn with the movement of the wheels. As illustrated however, the fingers 12 are shown as formed integral with ribs 14 on the sleeves $s$.

In order to hold the arms 10 normally in contact with the stop fingers 12, I provide coil springs 15 having their lower convolutions secured in the webs 14 while their upper convolutions extend laterally and are bent to form hooks 16, which are engaged with the inner sides of said arms 10.

When the machine is being propelled directly forward, the arms 10 will be held in contact with the stop fingers 12 by means of the coil springs 15 and, through the action of the link 8 and the arms 7, the arms 14 will normally contact with the front and rear stops 5 and 6. If however, the steering mechanism is operated to turn the wheels W to the right, since the arm 7 at the left of the machine cannot turn outwardly on account of the engagement of the arms 14 with the stops 5 and 6, the finger 12 will move outwardly from said arm 10. Upon this operation, the stop finger 12 at the right of the machine, will move inwardly, contact with the arm 10 at this side of the machine, and will, through the action of the connections between said arm and the arm 14, move said last mentioned arms out of contact with the stops 5 and 6 to turn the light L on this side of the machine. It will be understood that in turning to the left, the action of the above parts is merely reversed.

By the above described construction, I am enabled to maintain the rays from one of the head lights L directly in front of the machine at all times, while the other head light will be turned in the direction in which the machine is turning. This feature has been found after numerous experiments, to be very advantageous in the successful operation of devices of this character.

Although I have described my invention with considerable minuteness, I do not wish to be limited to details of construction other than those amplified in the appended claims.

Having thus described my invention, what I claim as new is:—

1. The combination with a vehicle having a fixed front axle, stub axles pivoted thereto and means for turning said stub axles in a substantially horizontal plane, of stops secured to said stubs, arms pivoted at one side of said stops, revolubly mounted head lights, operating arms thereon, means for normally causing said head lights to face forwardly and connections between said head light operating arms and the first mentioned arms for the purpose set forth.

2. The combination with a vehicle having a fixed front axle, stub axles pivoted thereto and means for turning said stub axles in a substantially horizontal plane, of stops secured to said stubs, arms pivoted at one side of said stops, supporting brackets, head lights revolubly mounted on said brackets, co-acting stops on said head lights and said brackets, operating arms on said head lights, links connecting said head light operating arms and the first mentioned arms and means for normally holding the stops on said brackets and head lights in contact for the purpose set forth.

3. The combination with a vehicle having a fixed front axle, stub axles pivoted thereto and means for turning said stub axles in a substantially horizontal plane, of laterally projecting stop fingers secured to said stubs, arms pivoted in the same plane therewith, springs normally holding said arms in contact with said stop fingers, supporting brackets having front and rear stops, head lights revolubly mounted on said brackets and having stops co-acting with the stops on said brackets, operating arms on said head lights and links connecting said head light operating arms and the first mentioned arms for the purpose set forth.

4. The combination with a steering mechanism, of a vehicle and independently movable head lights on opposite sides of the vehicle, head light actuating arms, means for limiting the movement of each of said arms in one direction, stops movable with the movement of the steering mechanism, pivotally mounted spring actuated arms adapted to be engaged and actuated by said stops and connecting links uniting the two sets of arms on each side of the machine.

In testimony whereof I have hereunto set my hand in presence of two subscribing witnesses.

THEODORE EDDY VAN DERWERKEN.

Witnesses:
J. RALPH HOGE,
J. A. GRIESBAUER.

Copies of this patent may be obtained for five cents each, by addressing the "Commissioner of Patents, Washington, D. C."